United States Patent Office 2,759,704
Patented Aug. 21, 1956

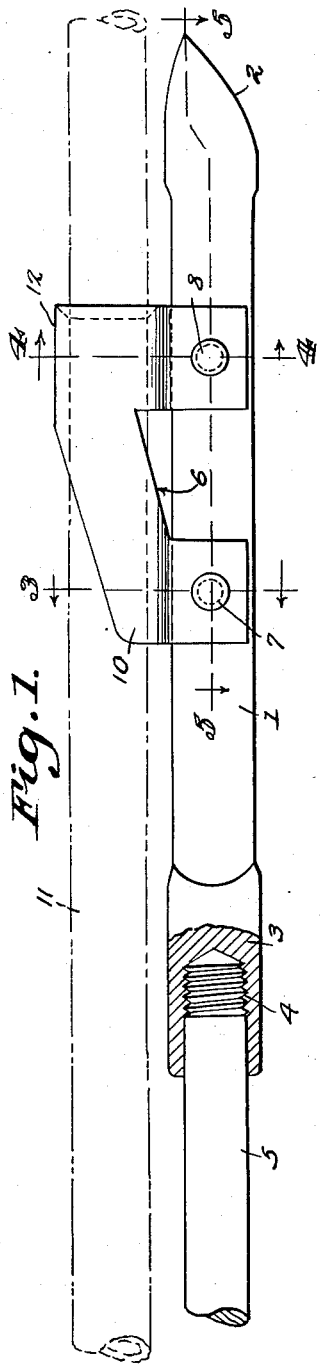
George Nemeth
INVENTOR

2,759,704
EQUIPMENT FOR LAYING PIPE
George Nemeth, Lorain, Ohio
Application April 2, 1953, Serial No. 346,340
3 Claims. (Cl. 255—2)

This invention relates to equipment for laying pipe underground and is particularly well adapted for use in replacing old water pipes or lines which extend horizontally underground and without digging a trench or disturbing vegetation, sidewalks or otherwise injuring the landscaping.

One object of the invention is to provide a tool which will be useful in laying a new pipe line adjacent to and parallel with an old defective pipe line in a facile manner without disturbing the surface of the ground or the landscaping, for example, where pipe lines leading from a water main or line adjacent the curb to a domestic water outlet located in a basement, and which old pipe line extends under a lawn and under shrubbery or the like. However, my improved tool is well adapted for use in laying a new pipe line underground adjacent and parallel to an old defective pipe line either with or without removing the old pipe line.

A further object of the invention is to provide an apparatus for laying new pipe line underground and parallel to an old ground pipe line which has become unfit for further use without disturbing the ground surface.

Further and more limited objects of my invention will appear as the description proceeds and by reference to the accompanying drawings in which like parts are designated by corresponding reference characters.

Fig. 1 is a view partly in elevation and partly in section showing my improved tool as it will appear when attached to an old pipe line.

Fig. 2 is a top plan view of the tool shown in Fig. 1.

Fig. 3 is a vertical sectional view on the line 3—3 of Fig. 1.

Fig. 4 is a horizontal sectional view on the line 4—4 of Fig. 1.

Fig. 5 is a fragmentary horizontal sectional view of the forward end of my improved tool.

Referring now to the drawing my improved tool consists of an elongated member 1 having a nose portion 2 at its forward end which is sharpened to provide a boring tool and a rear portion 3 which is enlarged and is provided with an internally threaded socket 4 adapted to receive an externally threaded end of a pipe section 5. Disposed intermediate the ends of the elongated member is a guide clamp designated generally by the reference character 6. This guide member surrounds the elongated member 1 and is preferably secured thereto by rivets 7 and 8 which permanently affix the guide to the elongated member 1. The guide member 6 is provided with a pair of upstanding portions 9 and 10 which are shaped in section as shown most clearly in Fig. 3 and which are shaped to embrace the lower sides of an old pipe section or line designated by the reference character 11. The forward portion of the guide is shaped to define a split ring member designated by the reference character 12 which is adapted to receive the pipe section of an old pipe line therethrough. The adjacent portions of the member 1 are recessed to receive therein the clamping members 9 and 10 and the forward clamping members which form the ring 12 so that the sides of the member 1 are smooth and no projections are outstanding therefrom.

When it is desired to lay a section of pipe beneath the ground in parallel relation to an old section of pipe which has become defective, one end of the old pipe section is uncovered and inserted through the loop or ring 12 of the guide member 6 in the position shown in Figs. 1 and 2. One end of the new pipe section 5 is then threadedly secured in the enlarged recess portion 3. The tool is then forced through the ground by means of a hydraulic pusher or a hand pusher. The guide member 6 serves to guide the tool as it is advanced along the old pipe section and serves to provide a conduit through which said new pipe section is drawn simultaneously with the advancing of the tool. The clamp 12 is preferably formed of stainless steel and the nose portion or tool is formed of tool steel. The tool itself is sufficiently rugged to withstand the shocks incidental to its use as described.

It can thus be seen that I may lay a new pipe line underground in a horizontal direction and parallel with a defective pipe line by advancing the boring tool horizontally underground to form a passageway to receive such new pipe line and using the old pipe line as a guide for such boring tool and simultaneously pushing the new pipe line through such passageway as the boring tool is advanced.

It will now be clear that I have provided an improved tool for laying a new pipe line underground in a horizontal direction parallel with a defective pipe line which will accomplish the objects of the invention as hereinbefore stated. The embodiment of the invention herein disclosed is to be considered merely as illustrative and not in a limiting sense as various changes may be made in the details of construction and arrangement of parts without departing from the spirit of my invention. The invention is therefore limited only in accordance with the scope of the appended claims.

What is claimed is:

1. A boring tool for forming a pipe receiving conduit horizontally underground and parallel with an old pipe line comprising an elongated member having a sharp nose portion at its forward end, means at its rear end for attaching a new pipe line thereto and means intermediate its ends for slidably attaching said member laterally spaced from and parallel to an old pipe line.

2. A boring tool for forming a pipe receiving conduit horizontally underground and parallel with an old pipe line comprising an elongated member having a sharp nose portion at its forward end, means at its rear end for attaching a pipe line thereto, and means intermediate its ends for slidably attaching said member to an old pipe line in laterally spaced parallel relation thereto, said last mentioned means comprising a looped guide rigidly secured to said member and shaped to slidably receive the old pipe line therein.

3. A boring tool of the character described comprising an elongated member of circular cross section having a pointed sharpened nose portion at one end and having its other end recessed and interiorly threaded to receive the exteriorly threaded end of a new pipe line, a guide member permanently secured to said member, by rivets, said guide having a pair of spaced clamping members adapted for engagement with the side of an adjacent old pipe and a looped portion shaped to provide a ring for receiving said adjacent pipe therethrough.

References Cited in the file of this patent

UNITED STATES PATENTS

| | | |
|---|---|---|
| 1,179,491 | Ammon | Apr. 18, 1916 |
| 2,074,003 | Templeton et al. | Mar. 16, 1937 |
| 2,305,200 | Sitton | Dec. 15, 1942 |
| 2,341,322 | Hubbell | Feb. 8, 1944 |
| 2,386,615 | Knapp | Oct. 9, 1945 |
| 2,705,613 | Miller et al. | Apr. 5, 1955 |

FOREIGN PATENTS

| | | |
|---|---|---|
| 168,429 | Great Britain | Sept. 7, 1921 |